Sept. 10, 1968   R. WAHLI   3,400,632
METHOD OF PHOTOGRAPHIC REPRODUCTION AND APPARATUS THEREFOR
Filed Feb. 7, 1966   4 Sheets-Sheet 1

INVENTOR.
Robert Wahli
BY
Pierce, Scheffler & Parker
Attorneys

United States Patent Office 3,400,632
Patented Sept. 10, 1968

3,400,632
METHOD OF PHOTOGRAPHIC REPRODUCTION AND APPARATUS THEREFOR
Robert Wahli, Unterengstringen, Zurich, Switzerland, assignor to Ciba Limited, Basel, Switzerland, a Swiss company
Filed Feb. 7, 1966, Ser. No. 525,443
Claims priority, application Switzerland, Feb. 12, 1965, 1,962/65
22 Claims. (Cl. 88—24)

This invention relates to a method of photographic reproduction and apparatus therefor in which a photographic negative or positive is scanned by a single light source and electrical signals are derived which are proportional to the density of each image point scanned, the electric signals being used to modify the light source in accordance with a tone correction programme to provide a predetermined density range on a copying material which is exposed to the same light source as the negative or positive.

Such methods and apparatus are well known and it is also known to provide compensation for spurious variations in intensity of the light generated by said source.

However many of these methods and apparatus suffer from various disadvantages and it is therefore an object of the present invention to provide an improved method of photographic reproduction and apparatus therefor.

According to the present invention we provide a method of photographic reproduction comprising scanning a transparent image to be reproduced with a light beam, deriving a first electrical signal dependant on the density value of each individual image point scanned by the beam and concurrently with the derivation of said first signal deriving a second signal dependant on the intensity of that beam as it scans each of said image points reduced by the transmission of each corresponding image point, modifying the first signal in accordance with a predetermined tone correction programme, comparing the modified first signal with said second signal, controlling continously said scanning beam in such a way as to reduce the difference between said modified first signal and said second signal substantially to zero and exposing a light sensitive copying material to said beam.

There is further provided apparatus for carrying out the method as defined above comprising a scanning system for generating a beam of light and scanning it over a transparent image to be reproduced and a light sensitive copying material to provide an image of the former on the latter, a first light sensitive device responsive to the light from said scanning beam which is reduced by the transmission of the individual points of said transparent image as said beam scans thereover, a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, a comparison device responsive to the modified third signal and said first signal to provide a signal for controlling the scanning beam so as to maintain the difference between the modified third signal and said first signal substantially to zero.

In order that the invention may be undestood preferred embodiments thereof will now be described with reference to the accompanying drawings, wherein.

Figure 1:
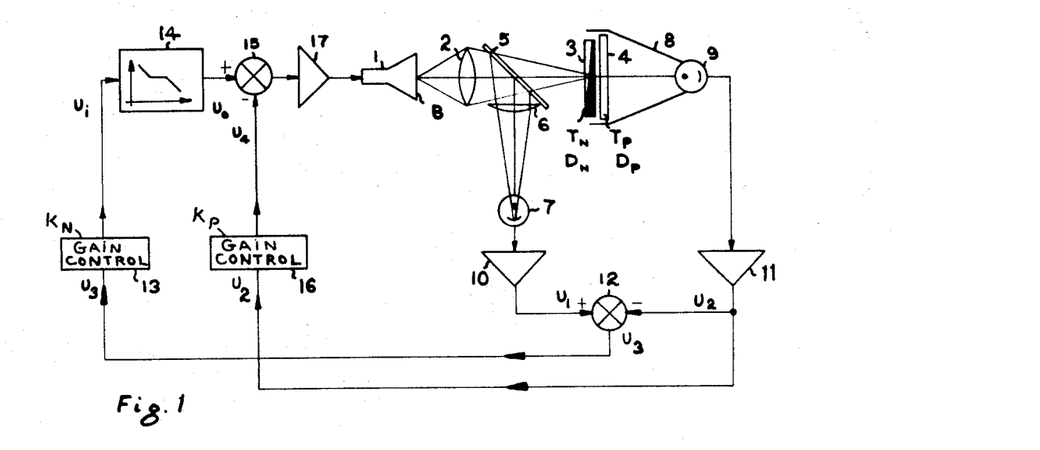
FIGURE 1 shows apparatus for tone correction of black and white transparent originals wherein the original is placed in contact with the copying material.

In FIGURE 1, 1 designates a cathode ray tube on the fluorescent screen of which a scanning raster is generated by deflecting circuits, not shown. An image of this raster is formed by an objective 2 upon a transparent photographic original 3 which is arranged in contact with a sheet 4 of an unexposed photographic film. The original transparency 3 and the sheet 4 are held in a cassette, not shown, which is preferably equipped with a vacuum suction device to ensure perfect contact between the transparency 3 and sheet 4.

A small fraction of the light emanating from the luminous spot on the scanning tube is reflected from a semi-reflecting mirror 5 and focussed by a condensing lens system 6 onto a photo-multiplier 7. However, the principal fraction of the light passes through the original 3 and the unexposed film 4 and is directed by a light collector 8 to a second photo-multiplier 9. The photo current of the multiplier 7 is converted in a logarithmic amplifier 10, and that of the multiplier 9 in an equivalent amplifier 11, into voltages which are proportional to the logarithm of the respective currents. In a comparison circuit 12, the output voltage $U_2$ of the amplifier 11 is subtracted from the voltage $U_1$ of the amplifier 10. The difference signal $U_3$ passes via a gain controller 13 as a signal $U_i$ to the input of a function transmitter 14 which constitutes a programmable computer with nonlinear transmission characteristics. The output signal $U_0$ of the function transmitter 14 is passed as reference signal to a comparison circuit 15 to which the output signal $U_2$ of the amplifier 11 is also fed in the form of a signal $U_4$ after passing through a gain controller 16. The deviation of the voltage $U_4$ from the reference voltage $U_0$ is amplified in an amplifier 17 and is applied as control signal $U_{st}$ to the grid of the cathode ray tube 1.

The apparatus shown in FIGURE 1 may be considered as a self-adapting control system, wherein the path from the comparison circuit 15 via an amplifier 17, scanning tube 1, optical-photographic system 2, 3, 4, photo-multiplier 9, logarithmic amplifier 11 and gain controller 16 back to the comparison circuit 15 constitutes a closed feedback loop, whereas the path from the comparison circuit 15 via amplifier 17, scanning tube 1 and the two separate paths: optical system 2, 5, 6, photo-multiplier 7 and logarithmic amplifier 10 to the reference circuit 12 on the one hand, and optical-photographic system 2, 3, 4, photo-multiplier 9 and logarithmic amplifier 11 to the comparison element 12 on the other hand, and from there in common via gain controller 13 and function transmitter 14 back to the comparison circuit 15 constitutes an open control or programme loop without feedback.

It is the underlying idea of the above apparatus that, for a given density distribution of the original it is possible to provide in the reproduction thereof a desired density distribution by controlling the transmission characteristics of the optical-photographic image paths. It can be demonstrated that the electrical signals which occur in the apparatus constitute an analogue of the photographic densities of the original and of the desired densities of the reproduction. In order to clarify this idea, let the original be assumed as negative and the reproduction as positive.

Figure 2:
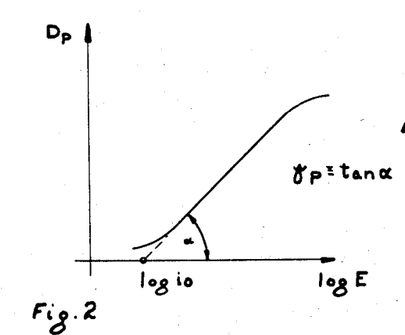
FIGURE 2 shows a typical density curve of a photographic emulsion.

FIGURE 2 shows a typical density curve for photographic material. We will assume that it relates to a positive emulsion which will be characterised by the index $p$. In the rectilinear part of the curve, the relation $$D_p = \gamma_p (\log E_p - \log i_o) \quad (1)$$

is valid. Here $D_p$ connotes the positive density, $\gamma_p$ the positive contrast, $E_p$ the exposure (product of illumination intensity and exposure time), and $i_o$ the so-called inertia of the material which is a measure of its sensitivity.

In the apparatus shown in FIGURE 1, $E_p$ is given by the relation $$E_p = B \cdot T_N \cdot t_B \cdot k_o \quad (2)$$

where $B$ connotes the luminous density of the scanning spot, $T_N$ the transmission value of the negative, $t_B$ the dwell time of the scanning ray on an image point, and $k_o$ a scale factor. In this connection let us assume scanning with uniform velocity for all image points, so that $t_B$ is constant, the luminous intensity $B$ is variable but it is conveniently standardised as follows:

$$B \equiv B/B_o \cdot B_o \quad (3)$$

where $B_o$ represents the luminous intensity of a light source having a constant light output. Putting the relations 2 and 3 in 1, I obtain $$D_p = \gamma_p \left( \log \left[ \frac{B}{B_o} \cdot B_o \cdot T_N \cdot t_B \cdot k_o \right] - \log i_o \right) \quad (4)$$

or, after some re-arrangement:

$$D_p = \gamma_p \left( \log \left[ \frac{B_o \cdot t_B \cdot k_o}{i_o} \right] + \log \frac{B}{B_o} + \log T_N \right) \quad (5)$$

The constant quantities are combined here to form a separate term which is expressed as follows:

$$\log \frac{B_o \cdot t_B \cdot k_o}{i_o} \equiv \log E_o \quad (6)$$

Furthermore, the standardised luminous density $B/B_o$ is defined as a mask transmission value $T_M$:

$$B/B_o \equiv T_M \quad (7)$$

because the variable luminous density $B$ can be thought of as that luminous density which occurs behind a combination of a light source of constant luminous density $B_o$ with a mask of variable transmission $T_M$.

The negative density is given by $$D_N \equiv \log \frac{1}{T_N} = -\log T_N \quad (8)$$

and we define:

$$D_M \equiv \log \frac{1}{T_M} = -\log T_M \quad (9)$$

It then follows from 5 with 6 . . . 9:

$$D_p = \gamma_p [\log E_o - (D_M + D_N)] \quad (10)$$

The following relations are obtained from FIGURE 1 for the electrical signals:

$$I_1 = B \cdot \rho_s \cdot k_1 \cdot G_1 \quad (11)$$

$$I_2 = B \cdot \tau \cdot k_2 \cdot T_N \cdot T_e \cdot G_2 \quad (12)$$

Here $\rho_s$ connotes the reflection value and $\tau$ the transmission value of the semi-transparent mirror 5, $k_1$ and $k_2$ scale factors which take into account, inter alia, the geometry and absorptions of the optical system, $G_1$ and $G_2$ the gain factors or sensitivities of the two photo-multipliers 7 and 9 respectively, $T_N$ the transmission value of the negative, and $T_e$ the transmission value of the unexposed positive emulsion 4. The latter will be assumed to be constant throughout the format thereof.

At the output of the logarithmic amplifiers 10 and 11, there appear voltages:

$$U_1 = k_3 \cdot \log \frac{I_1}{I_o} \quad (13)$$

and $$U_2 = k_4 \cdot \log \frac{I_2}{I_o} \quad (14)$$

respectively, wherein $$k_3 = k_4 \equiv U_n \quad (15)$$

is chosen and has the connotation of a standardisation constant. The current $I_o$ likewise serves for standardisation. The gain factors $G_1$ and $G_2$ are determined from the standardisation conditions:

$$I_1 = I_o \text{ for } B = B_o \quad (16)$$

and $$I_2 = I_1 \text{ for } T_N = 1 \quad (17)$$

From 17 taking in account more particularly 11 and 12 it follows that:

$$\rho_s \cdot k_1 \cdot G_1 = \tau_s \cdot k_2 \cdot G_2 \cdot T_e \equiv G_o \quad (18)$$

and hence from 13 and 14:

$$U_1 = U_n \log \left( G_o \cdot \frac{B}{I_o} \right) = U_n \log \left( G_o \frac{B_o}{I_o} \frac{B}{B_o} \right) \quad (19)$$

$$U_2 = U_n \log \left( G_o \frac{B}{I_o} T_N \right) = U_n \log \left( G_o \frac{B_o}{I_o} \frac{B}{B_o} T_N \right) \quad (20)$$

From the difference $U_1 - U_2$ it follows that:

$$U_3 = U_1 - U_2 = -U_n \log T_N = U_n \cdot D_N \quad (21)$$

The negative density $D_N$ can therefore be determined independently of the instantaneous value of the luminous density $B$, and can be expressed by a proportional voltage $U_3$.

Furthermore, having regard to the relations 7 and 20, it is valid that $$U_4 = k_p U_2 = k_p U_n \cdot \log \left( G_o \frac{B_o}{I_o} \cdot T_M \cdot T_N \right) \quad (22)$$

or $$U_4 = k_p U_n \left[ \log \left( \frac{G_o B_o}{I_o} \right) - (D_M + D_N) \right] \quad (23)$$

With the standardisation $$U_4^* \equiv \frac{U_4}{U_n} \quad (24)$$

a nondimensional expression is obtained.

$$U_4^* = k_p \cdot \left[ \log \left( \frac{G_o B_o}{I_o} \right) - (D_M + D_N) \right] \quad (25)$$

Similarly, $U_3$ can be standardised as follows in accordance with the relation 21:

$$U_3^* = \frac{U_3}{U_n} = D_N \quad (26)$$

Figure 6:
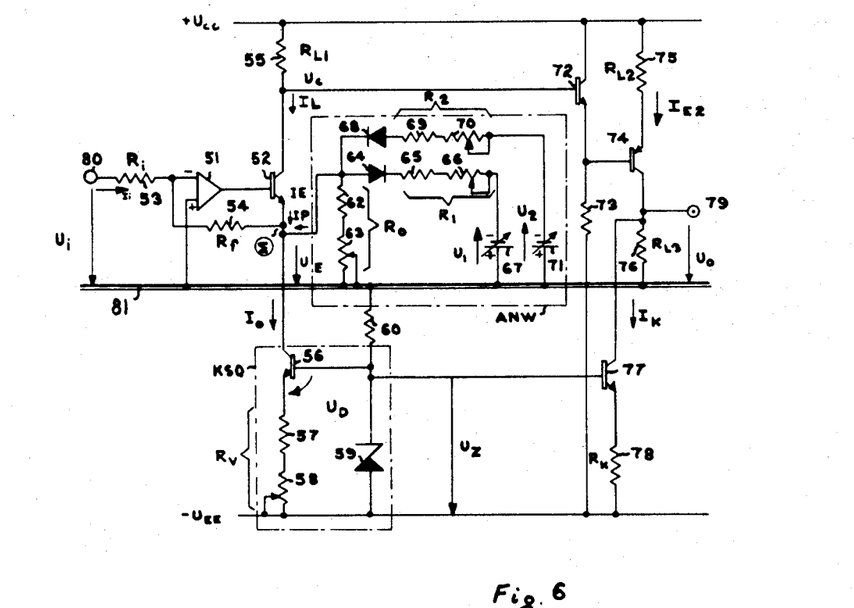
FIGURE 6 shows a circuit arrangement for a programmable computer or function generator.

The Equation 10 for density is analogous to the Equation 25 for the signal $U_4^*$. Taking into account simultaneously the Equation 26, it is therefore clear that, within the scope of the limiting condition assumed for Equation 1, and certain standardisation conditions in the apparatus shown in FIGURE 1, electrical signals are available which correspond on the one hand to the density $D_N$ in the scanned original and on the other hand to the density $D_p$ of the final reproduction. It is of course necessary in this context for the photographic processes involved (e.g., the sum of these resistors being designated $R_o$, a second branch containing a series connected arrangement of a semi-conductor diode 64 whose anode is connected to the emitter of transistor 52 and whose cathode is connected to a fixed resistor 65, a variable resistor 66 and a variable source 67 of negative voltage $-U_1$, and finally a third branch containing a series connected arrangement of a semi-conductor diode 68 whose cathode is connected to the emitter of transistor 52 and whose anode is connected to a fixed resistor 69, a variable resistor 70 and a variable source 71 of negative voltage $-U_2$. The sum of the resistors 65 and 66 is designated $R_1$, and the sum of the resistors 69 and 70 is designated $R_2$.

The collector of the transistor 52 is connected to the base of a further transistor 72 of NPN type whose collector is connected to the positive supply voltage $U_{cc}$ and whose emitter is connected to a load resistor 73 which is connected to the negative supply voltage $-U_{EE}$. Also connected to the emitter of the transistor 72 is the base of a PNP transistor 74, the emitter of which is connected to the positive supply voltage via a resistor 75 of value $R_{L2}$, whereas the collector is connected to earth via a load resistor 76 of value $R_{L3}$. The collector of the transistor 74 is further connected to a constant current source which comprises a transistor 77 and an associated resistor 78 of value $R_K$, and which also uses the Zener diode 59 as the reference voltage source. Lastly, the collector of the transistor 74 is also connected to an output terminal 79. The input terminal to the function transmitter is designated 80 to which the input voltage $U_i$ is applied, and the common reference terminal and earth conductor is designated 81.

If the potential of the emitter of transistor 52 is designated $U_E$, then, as is known, the following is valid with good approximation for the operational amplifier:

$$U_E = -\frac{R_f}{R_i} \cdot U_i \quad (37)$$

The choice of $R_f = R_i$ is specifically made for the function transmitter, so that with $$U_E = -U_i \quad (38)$$

an inverting amplifier for the input voltage is provided. The resistive part of the output impedance of the operational amplifier is very low due to feedback, so that the voltage $U_E$ is not influence by load changes. This effect is utilized in order to produce the nonlinear characteristic. The transistor 52 carries an emitter current $I_E$ which differs only very little from the collector current $I_L$. The difference may be made as small as desired if multiple transistor stages are used instead of the individual transistor 52. The current $I_p$ from the network ANW is added at the point $\Sigma$ to the emitter current $I_E$ and the input current $I_i$ of the function transmitter to form the current $I_o$; which in accordance with the preliminary conditions, is maintained constant and is independent of the potential $U_E$.

$$I_o = I_i + I_E + I_p = \text{a constant} \quad (39)$$

The currents $I_i$ and $I_p$ are a function of the input voltage $U_i$:

$$I_i = -\frac{U_E}{R_f} = \frac{U_i}{R_f} \quad (40)$$

$$I_p = -\left[\frac{U_E}{R_o} + \text{sig}\frac{U_E + U_1}{R_1} - \text{sig}\frac{(U_E + U_2)}{R_2}\right] \quad (41)$$

$$I_p = \frac{U_i}{R_o} - \text{sig}\frac{U_1 + U_i}{R_1} + \text{sig}\frac{U_i - U_2}{R_2} \quad (42)$$

The expression "sig $x$" here is intended to connote that the expression in question is to be taken as equal to zero for negative arguments $x$ in order to allow for the action of the diodes 68 and 64. The voltage drop across these diodes is neglected. Because $U_1$ corresponds to the negative density $D_N$, analogously only positive values of $U_i$ are admitted.

Accordingly, we obtain for the collector current $I_L$ of the transistor 52:

$$I_L = I_E = I_o - \left[U_i\left(\frac{1}{R_f} + \frac{1}{R_o}\right) + \text{sig}\frac{U_1 - U_i}{R_1} + \text{sig}\frac{U_i - U_2}{R_2}\right] \quad (43)$$

The collector potential $U_c$ of the transistor 52 is practically the same as the emitter potential of the transistor 74, because the voltage drop across the base-emitter diodes of the transistors 72 and 74 are approximately equal and of complementary polarity. Consequently the transistor 74 carries an emitter current $$I_{E2} = I_L \cdot \frac{R_{L1}}{R_{L2}} \quad (44)$$

which, if the base current is neglected, is also equal to the collector current, so that the following value is obtained as output voltage for the function transmitter, taking into account the current $I_k$ through the transistor 77:

$$U_o = R_{L3}(I_{E2} - I_k) = R_{L3}\left(I_L \frac{R_{L1}}{R_{L2}} - I_k\right) \quad (45)$$

For simplification, the choice $R_{L1} = R_{L2} = R_L$ is made. It then follows:

$$U_o = R_L \left\{[I_o - I_k] - \left[U_i\left(\frac{1}{R_f} + \frac{1}{R_o}\right) - \text{sig}\frac{U_1 - U_i}{R_1} + \text{sig}\frac{U_i - U_2}{R_2}\right]\right\} \quad (46)$$

Figure 7:
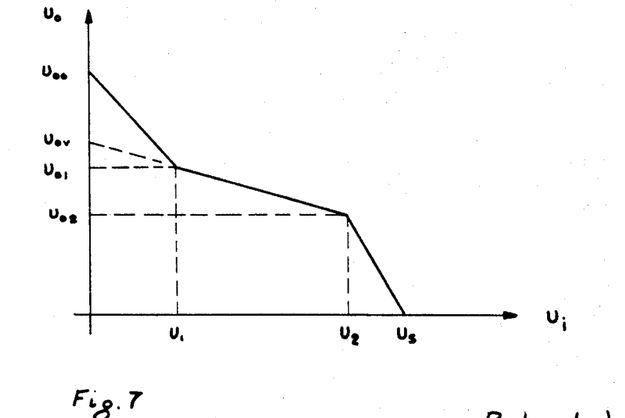
FIGURE 7 shows a graph to explain the method of adjustment for the computer of FIGURE 6.

This equation represents a curve whose shape is shown in FIGURE 7, which may be thought of as a typical example of a photographic transmission characteristic, if $U_o$ is proportional to the positive density $D_p$ and $U_i$ proportional to the negative density $D_N$. The equation contains four initially indeterminate parameters $R_o$, $R_1$, $R_2$ and $I_o$ or $R_v$, if the relation $$I_o = \frac{U_z - U_D}{R_v} \quad (47)$$

is to be taken into account, where $U_z$ connotes the voltage across the Zener diode 59 and $U_D$ the voltage drop across the base-emitter path of the transistor 56. The quantities $I_k$ and $R_f$ are determined by the circuit, whereas $U_1$ and $U_2$ represent independent variables. With the designations of FIGURE 7 it is possible to state four equations from which $R_o$, $R_1$, $R_2$ and $R_v$ can be calculated:

$$\begin{aligned}U_o &= U_{oo} \text{ for } U_i = 0\\ U_o &= U_{o1} \text{ for } U_i = U_1\\ U_o &= U_{o2} \text{ for } U_i = U_2\\ U_o &= 0 \text{ for } U_i = U_s\end{aligned} \quad (48)$$

However, for the practical adjustment the following method is more convenient:

The voltage sources $U_1$ and $U_2$ are first of all disconnected, so that the branches with the diodes 64 and 68 are open circuited. Then, for $U_i = 0$ we have:

$$U_o = U_{ov} = R_L(I_o - I_k) \quad (49)$$

whence $I_o$ and hence also $R_v$ is determined according to Formula 47. $R_o$ is further obtained from the relation (Formulas 46 and 49):

$$U_o = U_{o2} = U_{ov} - U_2\left(\frac{1}{R_f} + \frac{1}{R_o}\right) R_L \text{ for } U_i = U_2 \quad (50)$$

The voltage sources $U_1$ and $U_2$ are now included and from $$U_o = U_{oo} = U_{ov} + \frac{U_1}{R_1} \cdot R_L \text{ for } U_i = 0 \text{ follows } R_1 \quad (51)$$

the development) to be standardised sufficiently for the identity of corresponding constants (e.g., $K_p$ and $\gamma_p$) to be ensured.

It is accordingly possible to produce a specific density of reproduction by means of the apparatus shown in FIGURE 1, by prescribing the signal $U_o$ as a desired value and automatically adapting the variable parameters in such a way that the signal $U_4$ assumes the value prescribed by $U_o$. Only the mask density $D_M$ occurs as a freely variable parameter in the Equations 10 and 25, since all other values represent system constants of like $D_N$) are dictated by the photographic original. But due to the definition of $D_M$, this means that the luminous density B of the scanning spot must assume the role of the independent variable. By analogy to the photographic method, where a so-called mask is used together with a constant light source to influence the gradation, the intensity-modulated scanning raster may be thought of as a combination of a raster of homogeneous and constant luminous density with a superimposed variable light mask. This also explains the use of the term mask transmission in accordance with Equation 7. In contradistinction to the photographic mask, however, the immaterial light mask may also exhibit transmission values $T_M > 1$. This has the advantage that not only positive, but also negative masks can be generated on the luminous screen of the scanning tube during reproduction of one and the same original photograph.

Since on the one hand it is possible to produce a specific density of reproduction, and since on the other hand the apparatus shown in FIGURE 1 automatically ascertains the associated density for each image point of the original, it is possible to perform the task of gradation correction, which consists in associating the desired density of the reproduction with each existing density of the original according to a specific function. To this end, the apparatus shown in FIGURE 1 includes the programmable computer or function transmitter 14, into which electrical signals $U_i$ are fed which are proportional to the density values $D_N$ of the original. At the output of the computer there appears a signal $U_o$ which corresponds to the desired density values $D_p$ of the reproduction. The signal $U_o$ constitutes the desired value which the signal $U_4$ produced by the closed control loop must attain.

The analogy between photographic and electrical quantities is clear from the following mathematical relations: The general correlation between positive and negative densities can be expressed by $$D_p = D_N \cdot \psi^*(D_N) \tag{27}$$

where $\psi^*(D_N)$ connotes any desired, more particularly nonlinear, function of the negative density $D_N$. For the electrical system, on the other hand it is valid that $$U_o = U_i \cdot \psi(U_i) \tag{28}$$

if $\psi(U_i)$ constitutes the programme function or transmission function of the computer.

Now, further according to FIGURE 1

$$U_i = k_N U_3 = k_N \cdot U_n \cdot D_N \tag{29}$$

If for the moment, for simplification, the parameter $k_N = 1$ is assumed, and also using again the standardised quantities, it is valid that:

$$U_i^* = \frac{U_i}{U_n} = D_N \tag{30}$$

With Equation 29 and the limitation adopted with respect to $k_N$, the Equation 28 becomes $$U_o = U_n \cdot D_N \cdot \psi(U_n D_N) \tag{31}$$

whence by standardisation it further follows that:

$$U_o^* \equiv \frac{U_o}{U_n} = D_N \cdot \psi^*(D_N) = U_i^* \cdot \psi(U_i^*) \tag{32}$$

The function $\psi^*(U_i^*)$ is obtained in the general case by nonlinear transformation of $(\psi U_n \cdot D_N)$; it must be identical with the function in Equation 27 in order for the Equations 32 and 27 to be formally identical.

Figure 3:
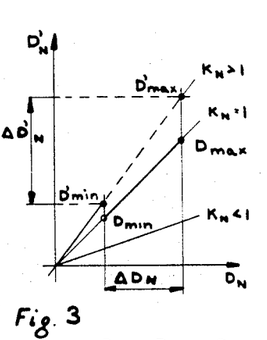
FIGURE 3 shows a graph to explain the linear expansion of a density range.

The parameter $k_N$, which was assumed above to be 1, is an expansion factor for the negative density $D_N$. It may occur, for example in practical operation, that for some reason an original negative exhibits too small a density range $\Delta D_N = D_{max} - D_{min}$. In this case, by a simple linear expansion $\Delta D_N' = k_N \Delta D_N$, according to FIGURE 3, the required negative range can be simulated without the need to prepare a fresh negative.

Figure 4:
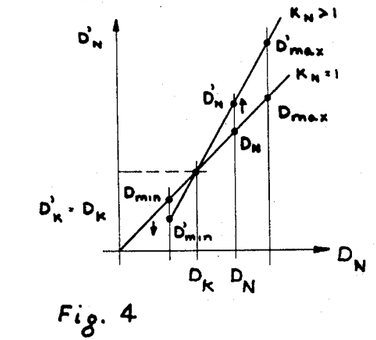
FIGURE 4 shows a graph to explain how a density curve can be modified.

However, it may be undesirable for both the minimum and the maximum densities to be modified in the same way. It might, for example, possibly be desired actually to reduce the minimum density when it is necessary to increase the maximum density. If reference is now made to FIGURE 4 it will be seen that:

$$D_N' = D_k + K_N(D_N - D_k) \tag{33}$$

applies, where the density $D_k$ plays the part of a second parameter in addition to $k_N$ and is identical with the negative density of the fixed image point under consideration.

In the apparatus shown in FIGURE 1, the relation $$U_1 = k_N U_3 = k_N(U_n D_N) = U_n(k_N D_N) = U_n \cdot D_N' \tag{34}$$

can be formed by a simple gain control by means of $k_N$.

The electrical relation analogous to Equation 33 accordingly is:

$$U_i = U_n \cdot D_N' = U_n[D_k + k_N(D_N - D_k)] = U_k - k_N(U_3 - U_k) \tag{35}$$

with $$U_k \equiv U_n D_k \tag{36}$$

Figure 5:
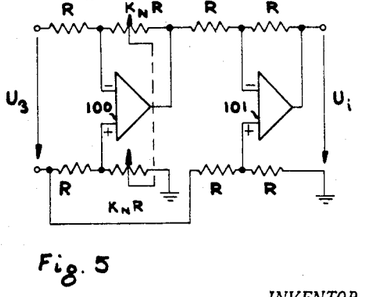
FIGURE 5 shows a schematic circuit arrangement for effecting the modification shown in FIGURE 4.

It can be realised, for example, by a computer circuit with two feedback amplifiers 100 and 101 and a double potentiometer $K_N R - K_N R$ as shown in FIGURE 5. Apart from the density-proportional signal $U_3$, a constant auxiliary signal $U_k$ is necessary in this case for the adjustment of the fixed density value $D_k$. The factor $k_N$ is adjusted by the double potentiometer referenced $K_N R$.

An example of a circuit for a programmable computer or function transmitter 14 for use in an arrangement according to FIGURE 1 is explained hereinbelow with reference to FIGURE 6. Other circuit arrangements are possible as will be appreciated by those skilled in the art.

In FIGURE 6, 51 designates a direct-current amplifier with a high gain factor, of which the output signal controls a transistor 52, and which is connected as an operational amplifier by means of two resistors 53 and 54 having the resistance values $R_1$ and $R_f$ respectively. The collector circuit of the transistor 52 contains a load resistor 55 having the value $R_{L1}$, which is connected to a voltage source $+U_{cc}$, of positive polarity. The collector potential of the transistor 52 is designated $U_c$. The emitter circuit of the transistor 52 contains a constant current source KSQ, comprising a transistor 56 having a fixed emitter resistor 57 and a variable emitter resistor 58, connected as a rheostat between the resistor 57 and a negative source voltage $-U_{EE}$. A series arrangement of a Zener diode 59 and a resistor 60 is connected between the source $-U_{EE}$ and the earth conductor 81, the voltage drop $U_z$ across the Zener diode being applied as a reference voltage to the base of the transistor 56. The constant current $I_o$ through the transistor 56 is determined by the quotient of the Zener voltage of the diode 59 divided by the base-emitter voltage of the transistor 56, and the sum $R_v$ of the resistors 57 and 58.

Between the emitter of the transistor 52 and earth there is placed an active network ANW, by means of which a non-linear transmission characteristic for the function transmitter can be obtained. The network ANW comprises individually three parallel connected branches, namely a first branch containing the series arrangement of a fixed resistor 62 one end of which is connected to the emitter of transistor 52, and a variable resistor 63, and finally from $$U_o = 0 = U_{ov} - U_s \left(\frac{1}{R_f} + \frac{1}{R_o}\right) R_L - \frac{U_s - U_2}{R_2} R_L \text{ for } U_i = U_s \quad (52)$$

the value of $R_2$ is obtained.

The voltages $U_i$ and $U_o$ may then be measured with direct-current instruments or with an oscillograph, and the relevant potentiometers are adjusted so that the actual value of their resistors need not be measured. The sequence of the adjustments is important since $R_o$ is affective throughout the total range of the input signals, $R_1$ and $R_2$ depend upon $R_o$ and thus the value of $R_o$ must be fixed before $R_1$ and $R_2$ are adjusted.

To determine the non-linear characteristic of the function generator an oscillograph with XY deflection and a saw-tooth generator may be used, feeding $U_i$ to the X amplifier and $U_o$ to the Y amplifier, so that the non-linear curve can be regulated by direct visual means using, for example, a raster calibrated in density values. For practical requirements it is convenient to have available a plurality of fixed programmes with non-linear characteristics such as that shown in FIGURE 7, in order to obviate the necessity of making different adjustments to the networks each time a different non-linear characteristic is required. For this purpose it is sufficient to keep a plurality of networks ANW each having different characteristics ready in a programme storage element and to connect each one of them as required to the summation point Σ.

The voltage sources $-U_1$ and $-U_2$ are assumed to be variable and are preferably electronically regulated main appliances, suitable circuits for which are known to those skilled in the art.

Figure 8A:
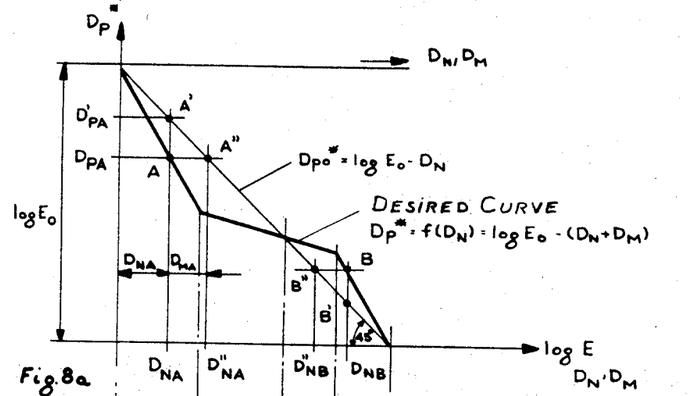
FIGURES 8a and 8b show two graphs to illustrate the mode of operation of the method according to the invention.

The mode of operation of the apparatus shown in FIGURE 1 can be deduced from the mathematical relations previously given. FIGURE 8a shows a graphic illustration of Equation 10 for the case $\gamma=1$, or taking a different view, a representation of the standardized relation $$D_p^* \equiv \frac{D_p}{\gamma} = \log E_o - (D_M + D_N) \quad (53)$$

Figure 8B:
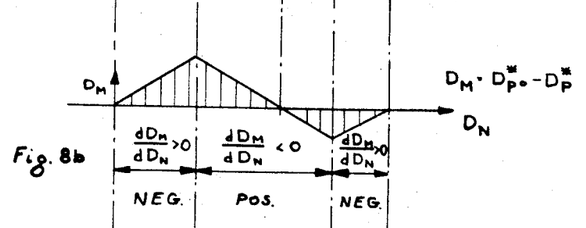

A point A on the desired positive density curve corresponding to a negative density $D_{NA}$ and a positive density $D_{pA}$. With no mask ($D_M=0$) the negative would be copied with the density $D_{NA}$ at the point A' having a density $D'_{PA}$. In order for the copy to exhibit the density $D_{PA}$, it is necessary for an apparent negative density $D_{NA}''$ to be present. This is obtained from the effective negative density $D_{NA}$ plus the mask density $D_{MA}$ for the point A. The latter is determined by the distance AA'' according to FIGURE 8a. Similar considerations apply to all the other points of the required curve $D_p^* = f(D_N)$. The mask density $D_M$ is obtained at each point as a difference of abscissae between the desired curve $D_p^* = \log E_o - (D_N + D_M)$ and the straight line $D_{po}^* = \log E_o - D_N$, according to which the copying process would proceed without masking. The sign of $D_M$ here is positive if the required apparent negative density $D_{NA}''$ is greater than the actual negative density $D_{NA}$, and negative if $D_{NA}''$ is less than $D_{NA}'$. A positive sign therefore connotes additional negative density, whilst a negative sign for example, for a point B, connotes reduced negative density as shown in FIGURE 8b. The mask itself has the appearance of a negative for positive values of the ratio $dD_M/dD_N$, but on the other hand that of a positive for negative values of the ratio.

It must be emphasized that the scanned original may equally well be a positive instead of the negative hitherto considered, in which case of course the reproduction is a negative. Thus the considerations given hereinbefore attain general validity if the term "original" is substituted for the expression "negative" or "positive" and the term "reproduction" for the expression "positive" or "negative" respectively.

Figure 9A:
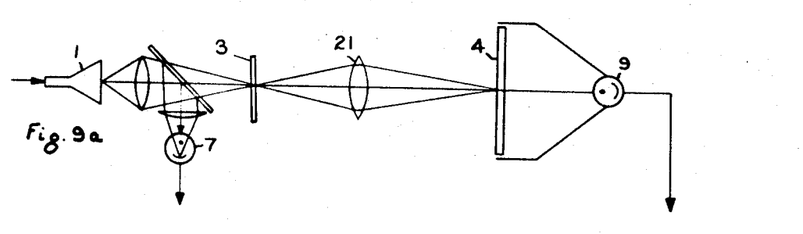
FIGURES 9a and 9b each show a variant of the apparatus shown in FIGURE 1.
Figure 9B:
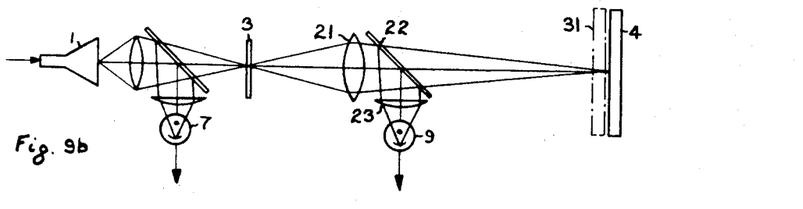

The method according to the invention is not restricted to application in a contact copying appliance as shown in FIGURE 1, for example enlargements or reductions of an original may also be obtained if an image forming optical system 21 shown in FIGURE 9a is included between the original 3 and the copying material 4 comprising the reproduction. In this case it may be convenient not to collect the light for the photo-multiplier 9 from a position behind the copying material 4, but to collect it directly from behind the image forming objective 21 by means of a semi-reflecting mirror 22, the light thus collected and reflected being focussed by a condenser 23 onto the photo-multiplier 9 as illustrated in FIGURE 9b. The advantage of this arrangement lies in the fact that the adaptation to variable image scales is facilitated and that for large final formats the light collection is simplified, and furthermore that the attenuation by the copying material of the light focussed on the photomultiplier 9 is eliminated.

It may be desirable in reproducing an original for use in a printing process to split the original up into a number of image areas by placing a line screen in front of the original to be copied. This is possible in an arrangement according to FIGURE 9b, if the copying material 4 has a glass line screen 31 (shown in chain-dotted lines) placed in front of it. In this case, if an acromatic line screen is used the light measurement must be performed in front of the screen i.e., by means of the semi-reflecting mirror 22—since otherwise the measured light would be modulated by the screen in a way which cannot be compensated. If on the other hand a coloured screen (e.g. magenta) is used, then the light measurement may be performed in the ray path behind the screen and the copying emulsion, if the light measuring element 9 has placed in front of it a filter of the same colour as the screen, which absorbs the spectrum range of the measured light which is modulated by the screen.

It has previously been assumed that the photographic process is performed with black and white material. However, the method and apparatus according to the invention is also applicable and finds utility in the reproduction of coloured originals for example in the tone correction of colour separation transparencies or in the manufacture of duplicates from coloured diapositives. In this case the measured light and copying light must be split up into the required spectral ranges by coloured filters.

It may possibly be desired to make a plurality of similar reproductions from the same original. In principle, the same original may then be scanned a plurality of times to produce a number of copies. It would however be more economical in such a case to produce an actual mask corresponding to the immaterial mask separately and to use the actual mask in register with the original in a conventional contact copying or enlarging apparatus.

The method above described permits the automatic production of such actual masks for multiple reproductions. For this purpose it is merely necessary, in the apparatus shown in FIGURE 1, to interchange the positions of the original 3 and of the copying emulsion 4—i.e., to arrange the latter in the optical ray path in front of the former, and to use a reversing material as a copying emulsion. The image of the mask produced by the scanning tube is projected onto the copying emulsion, where it is recorded.

It may be advantageous to use as a reversing emulsion a diapositive colour film, because this is silver-free and therefore scatters little light in the processed state. The unexposed emulsion scatters the scanning light slightly, so that the processed mask acquires a slight lack of definition, but this is desirable in certain specific applications. Nevertheless attempts will generally be made to use copying emulsions which are as transparent and have as little scatter as possible—e.g., by dispensing with the antihalation layer.

The cathode ray tube has been cited as an example of a scanning light source but the method and apparatus according to the invention is not restricted to this form of light source for it can also be performed with other types of modulable light sources—for example, with directly modulated crater lamps, incandescent lamps, arc lamps or with constant luminous sources in conjunction with controlled light values utilising for example, the known ADP and KDP crystals.

In contradistinction to the cathode ray tube, the light sources referred to above generally require a mechanical scanning movement of the means for producing light, or an image thereof, which is moved relative to the original required to be scanned. The applicability of the method is not restricted by the nature of generation of the scanning raster. More particularly, it can be applied without difficulty in the case of cylinder and cross-carriage scanners.

Hitherto it has been assumed for simplicity that the scanning movement of the light spot occurs with constant velocity. However, this is not a necessary condition of the method according to the invention. For example, in order to shorten the total scanning time the effect of the light masks may be produced by velocity-modulating the scanning beam. In this case the dwell time $t_B$ of the luminous spot on the individual image point is variable. Instead of Equation 10 therefore, taking Equation 6 into account, it is possible to write for the positive density generated:

$$D_p = \gamma_p \left[ \log \frac{B_o k_o}{i_o} + \log t_B - (D_M + D_N) \right] \quad (54)$$

This equation contains the two free parameters $\log t_B$ and $$-D_M \equiv \log \frac{B}{B_o}$$

It is helpful to standardise $t_B$ to a mean image point duration $t_o$:

$$t_B^* = \frac{t_B}{t_o} \cdot t_o \quad (55)$$

with $$E_o^* \equiv \frac{B_o k_o t_o}{i_o} \quad (56)$$

and $$D_v \equiv -\log \frac{t_B}{t_o} \quad (57)$$

the relation 54 becomes $$D_p = \gamma_p [\log E_o^* - D_v - (D_M + D_N)] \quad (58)$$

The variable image point duration is then taken into account in the form of a velocity-dependent density $D_v$ in order to emphasise the equivalence between the velocity and intensity modulation ($D_M$). Strictly considered, however, the relations indicated are valid only for the Schwarzschild coefficient $p=1$—i.e., within the region of validity of the reciprocity law.

In order for the analogy between the photographic process and the electrical simulation to be preserved, the signal according to Equation 25 must be completed by a term $D_v$:

$$U_{4v}^* = \frac{U_{4v}}{U_N} = k_p \left[ \log \frac{G_o B_o}{I_o} - D_v - (D_M + D_N) \right] \quad (59)$$

according to Equations 22 and 23, we can write:

$$U_{4v} = k_p U_{2v} = k_p (U_2 - U_n D_v) \quad (60)$$

Figure 10:
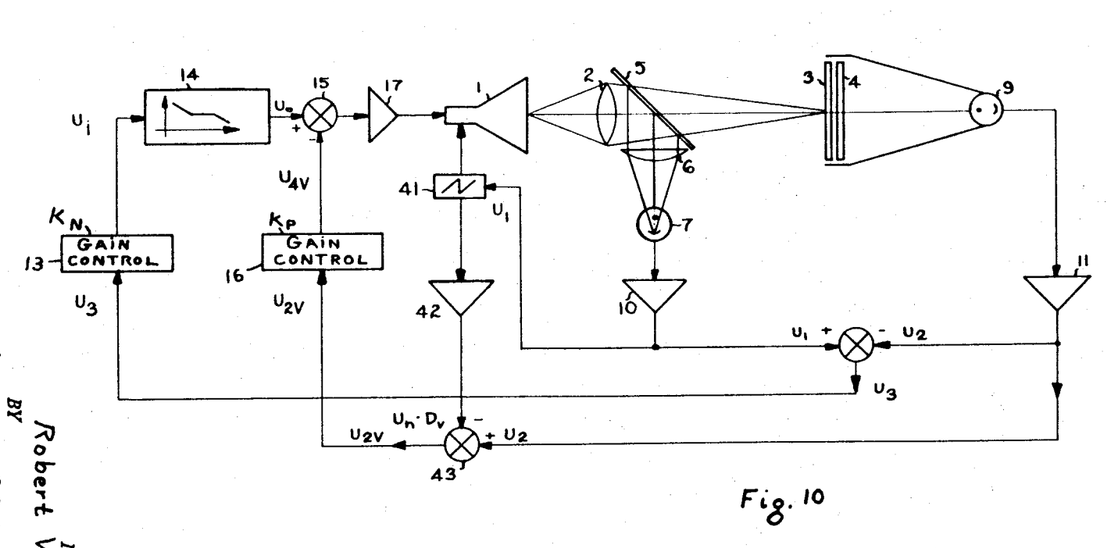
FIGURE 10 shows apparatus similar to that shown in FIGURE 1 but modified to provide velocity modulation of the scanning spot to achieve masking action thereof.

An arrangement for performing velocity modulation is illustrated in FIGURE 10. This circuit contains, apart from the elements of FIGURE 1, a deflecting circuit 41 for the scanning tube; a logarithmic amplifier 42 to detect the instantaneous deflection velocity and hence the local image point duration, also a subtraction stage 43.

The deflection generator 41 is modulated by the signal $U_1$ from the logarithmic amplifier 10. This signal is, by Equation 19, taking into account the definitions 7 and 9, a linear function of a mask density $D_M$:

$$U_1 = U_n \left( \log \frac{G_o B_o}{I_o} - D_M \right) \quad (61)$$

The deflection velocity of the luminous spot may in this way be controlled according to any desired law as a function of the mask density—for example, in the sense of a reinforcement of the mask in such a way that the deflection velocity is increased additionally in the case of a high mask density, and the image point duration is shortened. An apparent mask density $D_{M'}$, corresponding to $$D_{M'} \equiv D_M + D_v = \log \frac{B_o}{B} + \log \frac{t_o}{t_B} = \log \frac{B_o t_o}{B t_B} \quad (62)$$

may be defined. If $D_v$ is chosen say proportional to $D_M$:

$$D_v = m \cdot D_M \quad (63)$$

then it follows that $$D_{M'} = D_M + D_v (1+m) D_M \quad (64)$$

or $$D_{M'} = \log \left[ \frac{B_o}{B} \right]^{(1+m)} \quad (65)$$

whence the reinforcement of the light mask is clear. The logarithmic amplifier 42 in FIGURE 10 forms a signal $$U_n \cdot D_v = -U_n \log \frac{t_B}{t_o} = -U_n \log \frac{v_o}{v_B} \quad (66)$$

or $$U_n \cdot D_v = U_n \cdot \log \frac{v_B}{v_o} \quad (67)$$

where $v$ is the instantaneous deflection velocity and is taken into account in order that a time $$t_o = \frac{s_B}{v_o} \text{ or } t_B = \frac{s_B}{v_B} \quad (68)$$

is necessary in order to travel an element of distance $s_B$ of the magnitude of an image point on the luminous screen.

The signal $U_n \cdot D_v$ referred to must, in accordance with Equation 60, be subtracted from the signal $U_2$ in a subtraction stage 43, so that a fresh signal $U_{2v}$ is produced, which contains information both as to the mask density $D_M$ and also as to the "velocity mask" $D_v$ in addition to the original density $D_M$. It represents the equivalent of the photographic density $D_p$.

What is claimed is:

1. A method of photographic reproduction comprising scanning a transparent image to be reproduced with a light beam, deriving a first electrical signal dependant on the density value of each individual image point scanned by the beam and concurrently with the derivation of said first signal deriving a second signal dependant on the intensity of that beam as it scans each of said image points reduced by the transmission of each corresponding image point, modifying the first signal in accordance with a predetermined tone correction programme, comparing the modified first signal with said second signal, controlling continuously said scanning beam in such a way as to reduce the difference between said modified first signal and said second signal substantially to zero and exposing a light sensitive copying material to said beam.

2. A method according to claim 1 in which the scanning velocity of said light beam is maintained constant and the intensity of said scanning beam is controlled in such a way as to reduce the difference between said modified first signal and said second signal substantially to zero.

3. A method according to claim 1 in which the intensity of said light beam is maintained substantially constant and its scanning velocity is controlled in such a way as to reduce the difference between said modified first signal and said second signal substantially to zero.

4. A method according to claim 1 including linearly amplifying the first signal before modification thereof to expand the density range represented thereby and arranging for a predetermined signal value lying between the largest and smallest values attainable by said first signal to remain unchanged.

5. A method according to claim 1 in which the copying material is arranged in contact with the transparent image and on that side opposite to the side on which said scanning beam is incident.

6. A method according to claim 1 in which the copying material is arranged separated from the transparent image and on that side opposite to the side on which said scanning beam is incident and light passing therethrough is imaged on the former by an optical system to provide an image of the latter at a modified scale.

7. A method according to claim 1 including placing a screen which divides the incident light into image areas for half tone print between the transparent image and the copying material and adjacent the latter.

8. A method according to claim 1 in which the copying material is arranged in front of the transparent image so as to be scanned directly by said light beam to provide a mask for subsequent use with the transparent image to provide multiple copies thereof in known forms of copying apparatus.

9. Photographic reproduction apparatus comprising a scanning system for generating a beam of light and scanning it over a transparent image to be reproduced and a light sensitive copying material to provide an image of the former on the latter, a first light sensitive device responsive to the light from said scanning beam which is reduced by the transmission of the individual points of said transparent image as said beam scans thereover, a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, a comparison device responsive to the modified third signal and said first signal to provide a signal for controlling the scanning beam so as to maintain the difference between the modified third signal and said first signal substantially to zero.

10. Photographic apparatus according to claim 9, wherein the scanning system is a cathode ray tube and said signal for controlling the scanning beam is supplied via an amplifier on the grid of said cathode ray tube.

11. Photographic apparatus according to claim 9 including gain controllers inserted between the output from said subtracting means and said computer and between the output from said first logarithmic amplifier and said comparison device.

12. Photographic reproduction apparatus comprising a scanning system for generating a beam of light and scanning it over a transparent image to be reproduced and a light sensitive copying material to provide an image of the former on the latter, an optical system which comprises a first lens system for imaging said beam onto said transparent image, a partially silvered mirror located between said scanning system and said transparent image, a first light sensitive device responsive to the light from said scanning beam which is reduced by the transmission of the individual points of said transparent image as said beam scans thereover, a second lens system for imaging light reflected from said mirror onto a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, a comparison device responsive to the modified third signal and said first signal to provide a signal for controlling the scanning beam so as to maintain the difference between the modified third signal and said first signal substantially to zero.

13. Photographic apparatus according to claim 12, including means for arranging the copying material in contact with the transparent image and on that side of the latter opposite to the side on which said scanning beam is incident, and light collecting means for imaging light that has passed the transparent image and the copying material onto said first light sensitive device.

14. Photographic apparatus according to claim 12, including means for arranging the copying material in separation from the transparent image and on that side of the latter opposite to the side on which said scanning beam is incident, a third lens system located between the transparent image and the copying material for imaging light passing through said transparent image onto said copying material, and light collecting means for imaging light that has passed the transparent image and the copying material onto said first light sensitive device.

15. Photographic apparatus according to claim 12, including a third lens system for imaging light passing through said transparent image onto said copying material to form thereon an image of the latter at a modified scale, a second partially silvered mirror located between said third lens system and the copying material, and a fourth lens system for imaging light reflected from said second partially silvered mirror onto said first light sensitive device.

16. Photographic apparatus according to claim 15, including a screen located in front of the copying material for producing half-tone images thereon.

17. Photographic reproduction apparatus comprising a scanning system for generating a beam of light and scanning it over a transparent image to be reproduced and a light sensitive copying material to provide an image of the former on the latter, an optical system which comprises a first lens system for imaging said beam onto said transparent image, a partially silvered mirror located between said scanning system and said transparent image, a first light sensitive device responsive to the light from said scanning beam which is reduced by the transmission of the individual point of said transparent image as said beam scans thereover, a second lens system for imaging light reflected from said mirror onto a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, a comparison device responsive to the modified third signal and said first signal to provide a signal for controlling the scanning beam so as to maintain the difference between the modified third signal and said first signal substantially to zero, and linear gain controllers inserted between the output from said subtracting means and said computer and between the output from said first logarithmic amplifiers and said comparison device.

18. Photographic apparatus as claimed in claim 17, wherein the output voltage produced by said linear gain controllers being the sum of an adjustable auxiliary voltage and the difference of the input voltage and said auxiliary voltage multiplied by an adjustable amplification factor.

19. Photographic apparatus as claimed in claim 18, wherein said gain controllers include two feedback amplifiers and a double potentiometer for adjusting said amplification factor.

20. Photographic reproduction apparatus comprising a scanning system for generating a beam of light and scanning it over a transparent image to be reproduced and a light sensitive copying material to provide an image of the former on the latter, an optical system which comprises a first lens system for imaging said beam onto said transparent image, a partially silvered mirror located between said scanning system and said transparent image, a first light sensitive device responsive to the light from said scanning beam which is reduced by the transmission of the individual point of said transparent image as said beam scans thereover, a first colored screen located in front of the copying material for producing half tone images thereon, a second colored screen in front of said first light sensitive device, said second screen having the same color as said first screen and acting as a suppression filter for suppressing the modulation of the scanning beam by said first screen as it falls on said first light senitive device, a second lens system for imaging light reflected from said mirror onto a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, a comparison device responsive to the modified third signal and said first signal to provide a signal for controlling the scanning beam so as to maintain the difference between the modified third signal and said first signal substantially to zero.

21. Photographic reproduction apparatus comprising a scanning system for generating a beam of light and scanning it over a transparent image to be reproduced and a light sensitive copying material to provide an image of the former on the latter, an optical system which comprises a first lens system for imaging said beam onto said transparent image, a partially silvered mirror located between said scanning system and said transparent image, a first light sensitive device responsive to the light from said scanning beam which is reduced by the transmission of the individual points of said transparent image as said beam scans thereover, a second lens system for imaging light reflected from said mirror onto a second light sensitive device responsive to the intensity of said light beam, first and second logarithmic amplifiers in series with said first and second light sensitive devices respectively, first and second signals appearing on the output of said first and second logarithmic amplifiers, subtracting means adapted to subtract said first signal from said second signal to provide a third signal which is dependent on the density value of each individual point scanned, a tone correction computer for modifying said third signal in accordance with the density values required in the copying material, deflection means for controlling the velocity of the deflection of said scanning beam, said deflection means being controlled by said second logarithmic amplifier, a third logarithmic amplifier, the input of said third logarithmic amplifier being controlled by said deflection means, a mixer circuit for mixing the output signals of said first and third logarithmic amplifiers, a comparison device responsive to the modified third signal and the output of said mixer circuit to provide a signal for controlling the intensity of the scanning beam so as to maintain the difference between the modified third signal and the output-signal of said mixer circuit substantially to zero.

22. Photographic apparatus according to claim 20, including gain controllers inserted between the output from said subtracting means and said computer and between the output from said mixer circuit and said comparison device.

References Cited

UNITED STATES PATENTS

| | | | |
|---|---|---|---|
| 2,977,407 | 3/1961 | Hirsch | 88—24 |
| 2,985,063 | 5/1961 | Putzrath | 88—24 |

NORTON ANSHER, *Primary Examiner.*

WAYNE A. SIVERTSON, *Assistant Examiner.*